United States Patent
Hoppe

[19]

[11] Patent Number: 6,075,651
[45] Date of Patent: *Jun. 13, 2000

[54] COMPACT COLLIMATING APPARATUS

[75] Inventor: Michael Hoppe, Vista, Calif.

[73] Assignee: Kaiser Electro-Optics, Inc., Carlsbad, Calif.

[*] Notice: This patent is subject to a terminal disclaimer.

[21] Appl. No.: 09/239,356

[22] Filed: Jan. 28, 1999

[51] Int. Cl.[7] .......................... G02B 27/30; G02B 27/14; G02B 5/32

[52] U.S. Cl. .......................... 359/641; 359/630; 359/631; 359/633; 359/15

[58] Field of Search .................... 359/641, 630, 359/631, 633, 15

[56] References Cited

U.S. PATENT DOCUMENTS

| | | | |
|---|---|---|---|
| 3,443,858 | 5/1969 | La Russa | 359/494 |
| 3,679,290 | 7/1972 | Adams et al. | 349/199 |
| 3,711,181 | 1/1973 | Adams, Jr. et al. | 349/194 |
| 3,816,005 | 6/1974 | Kirshner | 356/251 |
| 3,957,348 | 5/1976 | Saeva | 349/98 |
| 4,390,276 | 6/1983 | Budden et al. | 356/251 |
| 4,653,875 | 3/1987 | Hines | 359/487 |
| 4,704,010 | 11/1987 | Stana et al. | 359/641 |
| 4,781,426 | 11/1988 | Baker | 385/33 |
| 4,859,031 | 8/1989 | Berman et al. | 349/11 |
| 5,028,121 | 7/1991 | Baur et al. | 349/9 |
| 5,050,966 | 9/1991 | Berman | 359/38 |
| 5,267,063 | 11/1993 | Ray | 359/49 |
| 5,325,218 | 6/1994 | Willett et al. | 349/47 |
| 5,371,617 | 12/1994 | Mitsutake et al. | 359/40 |
| 5,379,135 | 1/1995 | Nakagaki et al. | 359/40 |
| 5,408,346 | 4/1995 | Trissel et al. | 359/38 |
| 5,526,184 | 6/1996 | Tokuhashi et al. | 359/630 |
| 5,585,946 | 12/1996 | Chern | 349/5 |
| 5,596,451 | 1/1997 | Handschy et al. | 359/633 |
| 5,654,828 | 8/1997 | Togino et al. | 359/633 |
| 5,715,023 | 2/1998 | Hoppe | 349/11 |

FOREIGN PATENT DOCUMENTS

0451 034 A1  9/1991  European Pat. Off. .

OTHER PUBLICATIONS

Product Literatue for "3M™ Dual Brightness Enhancement Film (DEBF)," (©1996 3M Corporation) 6 pages.

*Primary Examiner*—Georgia Epps
*Assistant Examiner*—S. Seyrafi
*Attorney, Agent, or Firm*—David G. Beck; Townsend and Townsend and Crew, LLP

[57] ABSTRACT

A compact, lightweight, multi-wavelength display system which can be used as a collimating eyepiece is provided. The system utilizes a polarization selective optical element, or PS element, that reflects one linear polarization state while transmitting radiation of the orthogonal linear polarization state. The PS element is used in combination with a quarter wave plate and an optical element, the optical element including a partially reflective surface. The optical element may either be a single element or an optical doublet. In the latter configuration, the partially reflective surface is at the interface between the two singlets that comprise the doublet. The system also includes an image source that either alone, or in combination with other optical elements, produces circularly polarized light of the desired rotary sense.

18 Claims, 2 Drawing Sheets

COMPACT COLLIMATING APPARATUS

FIELD OF THE INVENTION

The present invention relates generally to visual display systems and, more particularly, to a compact, collimating system utilizing a polarization selective optical element in combination with a quarter wave plate.

BACKGROUND OF THE INVENTION

Optical collimating apparatus have been known for some time. For example, U.S. Pat. No. 4,704,010 discloses a device capable of generating an optical collimating beam using a single, plano-convex lens. A collimating mark is applied on the convex surface and a reflective coating is applied to the central portion of the plano surface. Light emanating from the collimating mark makes a double pass through the lens, exiting the plano surface as a collimated beam. The collimating mark is imaged at infinity. In a specific embodiment, the collimating mark is illuminated using a prism.

U.S. Pat. No. 4,859,031 discloses an optical collimating device using a semi-reflective concave mirror and a cholesteric liquid crystal element. In at least one of the disclosed embodiments, the collimator is used in conjunction with a combiner, thus allowing the system to be used in a heads-up display device. Images in the line of sight of the viewer substantially pass through the combiner, semi-reflective mirror, and cholesteric liquid crystal to the viewer. Images generated by a source are reflected by the combiner into the line of sight of the viewer. The generated images pass through the semi-reflective mirror to the cholesteric liquid crystal element. The cholesteric element reflects the images back to the concave side of the semi-reflective mirror. The concave mirror creates an image of the source at the same time it reverses the polarization of the image, thus allowing it to pass through the cholesteric element to the viewer.

U.S. Pat. No. 5,408,346 discloses an optical collimating device using a cholesteric liquid crystal element, the device exhibiting improved image transmissivity. Both reflective and transmissive systems are disclosed. The patent also discloses the use of the collimator in conjunction with a combiner, thus allowing multiple images to be superimposed for viewing by the user.

U.S. Pat. No. 5,715,023 discloses a compact display system that can be used as a collimating eyepiece. The system uses a cholesteric liquid crystal element in combination with an optical doublet. A partially reflective coating is at the interface between the two singlets which comprise the doublet. The design of this system reduces the number of element to air and/or element to element interfaces, thus reducing losses and ghosting while making a sturdy, vibration tolerant display system. In one embodiment of the disclosed system multiple cholesteric liquid crystal elements are used, thus achieving a multicolor display system.

From the foregoing, it is apparent that a compact, collimating eyepiece is desired that is capable of operating over a wide range of wavelengths. This device is of particular interest in the area of head-mounted displays where size and weight are critical factors.

SUMMARY OF THE INVENTION

The present invention provides a compact, lightweight display system which finds particular application as a collimating eyepiece. The system utilizes a polarization selective optical element, or PS element, that reflects one linear polarization state while transmitting radiation of the orthogonal linear polarization state. The PS element of the invention is used in combination with a quarter wave plate and an optical element, the optical element including a partially reflective surface. Preferably the optical element used in combination with the PS element is an optical doublet. In this configuration the partially reflective coating is at the interface between the two singlets that comprise the doublet.

The system includes an image source that either alone, or in combination with other optical elements, produces circularly polarized light of the desired handedness. For example, the image source may produce randomly polarized light that is then passed through a linear polarizer and a quarter wave retarder in order to achieve the desired circular polarization. The light from the source passes through the optical element, including the partially reflective coating, before passing through the quarter wave plate. The partially reflective coating does not alter the polarization of the transmitted light while the quarter wave plate causes the circularly polarized light to become linearly polarized. The system is designed such that the PS element will reflect the particular linear polarization of the light passing through the quarter wave plate. After reflection by the PS element, the light passes through the quarter wave plate a second time, thereby returning to the same handedness of circular polarization as originally emitted by the source. A portion of this light is reflected by the partially reflective coating on the optical element, this reflection causing the rotary sense of the circularly polarized light to become reversed. Due to this reversal, the light reflected by the optical element is allowed to pass virtually unheeded through the combination of the quarter wave plate and the PS element.

In a particular embodiment of the invention the entire device is bonded together, thereby achieving an extremely vibration tolerant device. In this embodiment the source and any required source polarizers are bonded to an optical doublet, the doublet including the partially reflective coating at the interface between the singlets. The quarter wave plate and PS element combination are directly deposited onto the surface of the doublet opposite the source. In order to achieve improved image quality, another polarizer as well as an anti-reflection coating can be applied to the exit surface of the device.

In another embodiment of the invention, light from the image source is reflected off of a combiner into the device, thus allowing a second image to be combined with the first image. The combiner can utilize a simple partially reflective coating or a wavelength or polarization sensitive reflective coating. This embodiment of the invention is ideally suited for use with a heads-up display.

A further understanding of the nature and advantages of the present invention may be realized by reference to the remaining portions of the specification and the drawings.

DESCRIPTION OF THE SPECIFIC EMBODIMENTS

The present invention utilizes a polarization selective optical element, hereafter referred to as a PS element, that reflects one linear polarization state while transmitting radiation of the orthogonal linear polarization state. An example of such a material is the Dual Brightness Enhancement Film (DBEF) produced by 3M™. Such material can be designed to efficiently reflect electromagnetic radiation in a broad band of wavelengths, for example visible light, that is of a particular sense of plane, or linear, polarization while transmitting light of an orthogonal polarization. For example, a PS element can be designed to reflect p-polarized visible light while transmitting s-polarized light. The PS element does not alter either the polarization of the transmitted light or the polarization of the reflected light.

Figure 1:
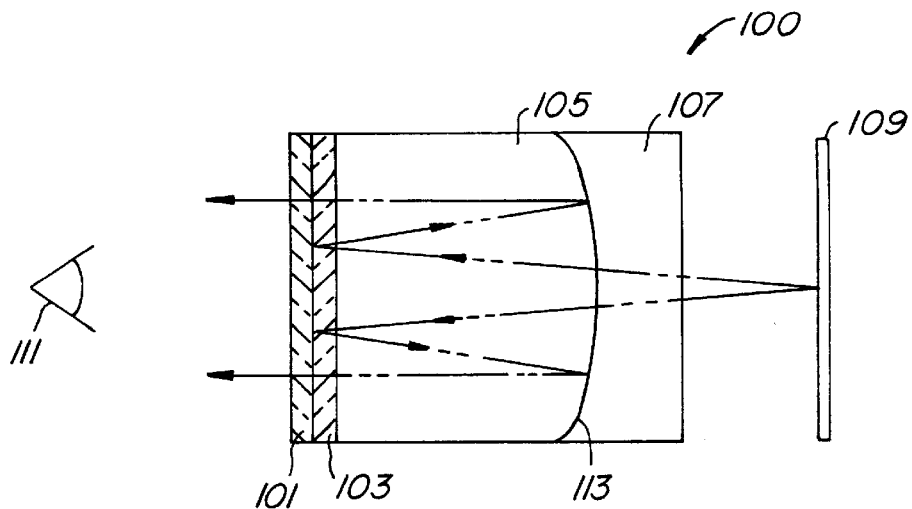
FIG. 1 is an illustration of an embodiment of the invention utilizing a PS element and an optical doublet.

FIG. 1 is an illustration of an imaging system 100 according to the invention. This embodiment of the invention utilizes a PS element 101 in conjunction with a quarter wave plate 103. System 100 also includes a doublet comprised of two plano singlets, 105 and 107, cemented together and an image source 109. In this embodiment of the invention, source 109 produces circularly polarized light.

The curvature of the optical doublet of system 100 is designed to produce a collimated image from source 109, for example at a viewing location 111. Although the production of a collimated image is the preferred application of the invention, the system can also be used for other applications. Similarly, the preferred embodiment of the invention uses an optical doublet although a single optical element can be used with the invention. The use of an optical doublet as illustrated in FIG. 1 reduces the number of element to air and/or element to element interfaces, thereby reducing losses and ghosting while making a sturdier, more vibration tolerant display system.

In the illustrated embodiment, singlet 105 is a plano-convex lens and singlet 107 is a plano-concave lens. Singlets 105 and 107 have the same radius of curvature. At the boundary between singlets 105 and 107 is a partially reflective coating 113. In the preferred embodiment coating 113 is a dielectric coating with a transmittance of approximately 50 percent and a reflectance of approximately 50 percent in the wavelength range of interest.

In operation, a portion of the light from source 109 will pass unheeded through coating 113. The amount of light passed is dependent upon the reflectivity of coating 113. The polarization of the light passing through coating 113 is unaltered. The circularly polarized light passing through coating 113 passes through quarter wave plate 103 causing the circularly polarized light to become linearly polarized. The system is designed such that PS element 101 reflects the particular polarization of the linearly polarized light passing through polarizer 103. As the light reflected by PS element 101 passes through quarter wave plate 103 again, the polarization is changed from linear polarization to circularly polarized light of the same handedness as the light produced by source 109. A portion of this light is reflected by coating 113, the amount reflected being dependent upon the reflectivity of coating 113. The polarization of the light reflected by coating 113 will be reversed, thus allowing it to pass virtually unheeded through the combination of PS element 101 and quarter wave plate 103. The image created at site 111 by the light passing through system 100 depends primarily upon the curvature of coated surface 113. For example, surface 113 can be designed to form a collimated light beam.

In a specific example of the invention, the light from source 109 is right circularly polarized (i.e., RCP). Assuming surface 113 is coated with a 50/50 coating, approximately 50 percent of the light from source 109 will pass through coating 113 to quarter wave plate 103. As the RCP light makes a first pass through quarter wave plate 103, it is changed to linearly polarized light of a first polarization. PS element 101 reflects the linearly polarized light back through quarter wave plate 103, resulting in RCP light impinging on reflective surface 113. Once again, 50 percent of the light impinging on surface 113 is lost. That portion of light reflected by surface 113 reverses handedness, thus becoming left circularly polarized (i.e., LCP). As the LCP light passes through quarter wave plate 103, it is changed to linearly polarized light of a second polarization orthogonal to the first polarization. This light passes through 101. Thus approximately 25 percent of the source radiation will be passed by system 100. Collimating system 100 can be designed to work equally well with other polarizations.

The embodiment illustrated in FIG. 1 does not contain any polarizers that are directly associated with source 109. Therefore if source 109 produces radiation other than that for which the combination of PS element 101 and quarter wave plate 103 have been designed, this radiation will not undergo the proper reflection by coating surface 113. For example, if PS element 101 and quarter wave plate 103 are designed to reflect incident RCP light as in the prior example, LCP light produced by source 109 will pass through system 100 without being reflected by surface 113. Thus if surface 113 is intended to produce a collimated image of source 109, the LCP light produced by the source will pass unheeded through the system and therefore not be collimated by reflective surface 113. As a result, the quality of the image displayed at site 111 will be reduced.

Figure 2:
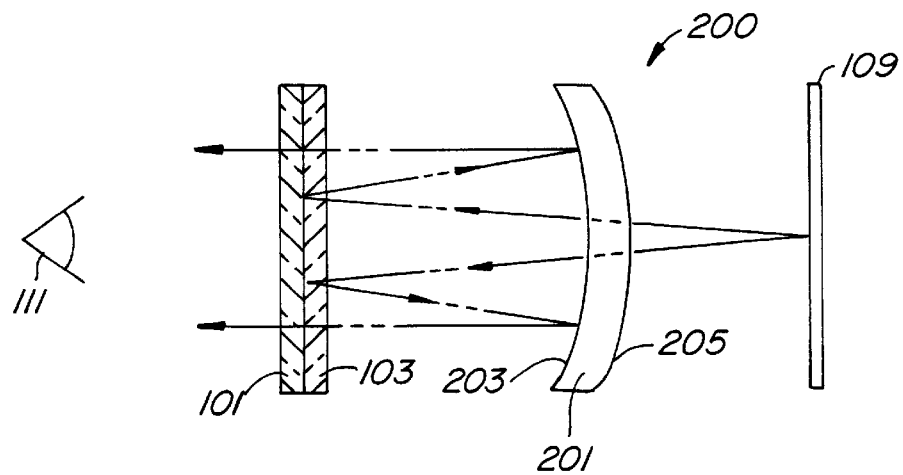
FIG. 2 is an illustration of an embodiment similar to that shown in FIG. 1 except that the optical doublet is replaced with a single optical element.

FIG. 2 illustrates an embodiment of the invention that is functionally equivalent to the embodiment illustrated in FIG. 1. As in the prior embodiment, the system includes source 109, quarter wave plate 103, and PS element 101. In this embodiment the optical doublet comprised of elements 105 and 107 is replaced by a single optical element 201. Optical element 201 includes a reflective coating, preferably deposited on surface 203 although the coating can also be applied to surface 205. The coated surface has the appropriate curvature to impart the desired degree of collimation to the light reflected by the PS element/quarter wave plate combination. Although this embodiment is functionally equivalent to the prior embodiment, due to the additional element-to-air interfaces, it is typically less efficient.

Systems 100 and 200 share the same capability for broad-band imaging, thus enabling them to be used as a compact, multi-color (i.e., multi-wavelength) collimating system. As the primary limitation to this broad-band capability, other than for the output of the source, is that imposed by the wavelength dependence of the reflective coating, a broad-band reflective coating is preferably used. Such coatings are well known by those of skill in the art and therefore will not be described in detail in this specification.

Figure 3:
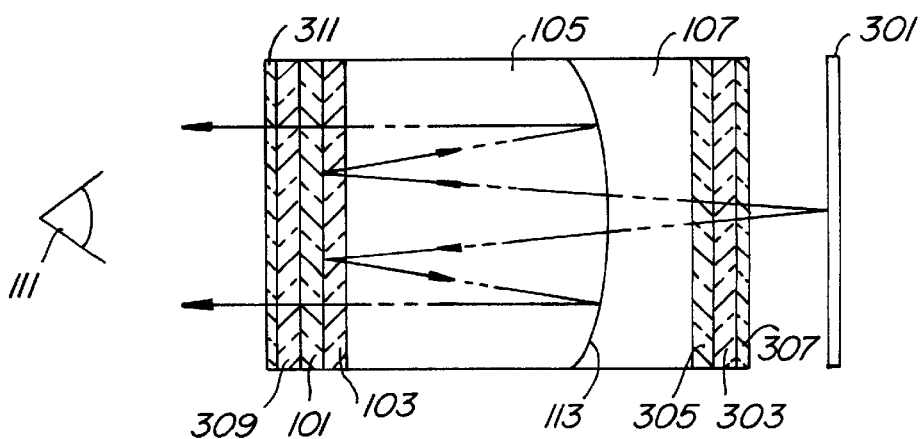
FIG. 3 is an illustration of an embodiment utilizing various optical coatings to improve image contrast and reduce ghosting.

FIG. 3 illustrates an alternate embodiment of the invention. This embodiment, as in the embodiment illustrated in FIG. 1, is comprised of a plano-convex singlet 105, a plano-concave singlet 107, and a partially reflective coating 113 interposed between singlets 105 and 107. It is understood that the 105/107 doublet can be replaced with an element similar to element 201 of FIG. 2 while retaining the distinctive features of this embodiment. This embodiment also includes PS element 101 and quarter wave plate 103.

This embodiment of the invention uses a source 301 that produces randomly polarized light. Any number of source types can be used in this embodiment, for example source 301 can be a cathode ray tube (CRT). The light from source 301 is linearly polarized with a polarizer 303 and then passed through a quarter wave retarder 305 which circularly polarizes the image light to the same rotary sense as that required by the PS element/quarter wave plate combination. To reduce reflectance losses, an anti-reflection (AR) coating 307 is preferably applied to the outer surface of polarizer 303. The light which passes through the display system, including the PS element/quarter wave plate combination, then passes through an optional coating stack in order to improve image contrast and reduce ghosting. This stack is comprised of a polarizer 309 and an AR coating 311. In an alternate embodiment, polarizer 303 and retarder 307 are coupled directly to source 301.

Figure 4:
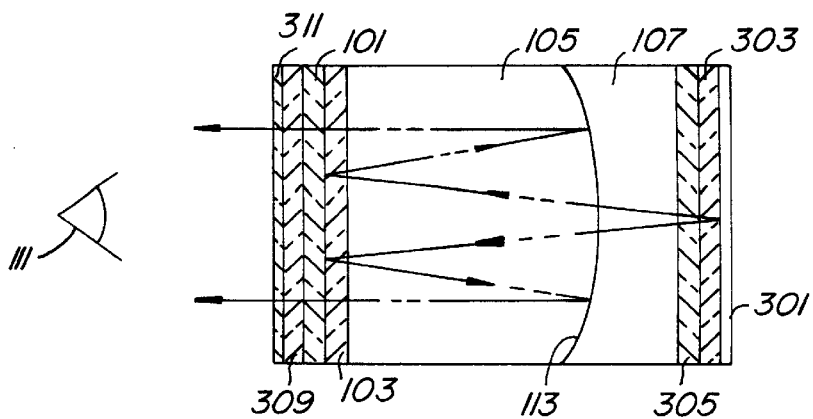
FIG. 4 is an illustration of an embodiment in which the display source is directly attached to an eyepiece optical train.

FIG. 4 illustrates an alternate embodiment of the system shown in FIG. 3. In this system source 301 is directly adhered to the device, thus eliminating another pair of air interfaces (i.e., source/air and air/polarizer). The total system is comprised of source 301, linear polarizer 303, quarter wave retarder 305, plano-concave singlet 107, partial reflective coating 113, plano-convex singlet 105, quarter wave plate 103, PS element 101, polarizer 309 (optional), and AR coating 311 (optional). The only surface to air interface in this system is that at the exit plane, thus eliminating numerous sources of radiation loss and ghosting as well as improving image contrast and reducing the complexity and cost of the system.

Figure 5:
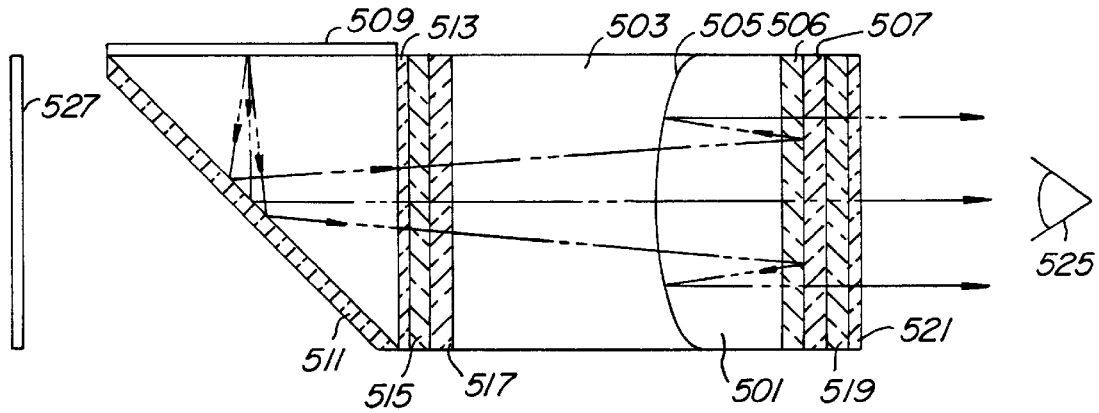
FIG. 5 is an illustration of an embodiment of the present invention which allows an image from a first source to be combined with an image from a second source.

FIG. 5 is an illustration of an embodiment of the present invention which allows an image from a first source to be combined with an image from a second source. The basic system in this embodiment is comprised of plano-convex singlet 501, planoconcave singlet 503, partial reflective coating 505 interposed between singlets 501 and 503, quarter wave plate 506, PS element 507, source 509, and combiner 511. The system also includes AR coating 513 (optional), linear polarizer 515, and quarter wave plate 517. Quarter wave plate 517 circularly polarizes the linearly polarized source light so that it has the appropriate rotary sense for the quarter wave plate 506/PS element 507 combination. For improved performance the system also contains polarizer 519 and AR coating 521.

Many techniques are well known in the art for the fabrication of combiner 511. For example, combiner 511 can be a partial reflector which reflects the image from source 509 into the line of sight of an observer 525 while simultaneously passing the image of source 527 to the observer. Another type of combiner which can be used in this embodiment is a combiner which has a wavelength selective reflective coating. Such a combiner is ideally suited for applications in which only minimal information is required from source 509. For example, source 509 may be used to project markings (eg., targeting system) or instrumentation (e.g., fuel, air speed, altitude, etc. on a heads-up display) onto the image from source 527. In such applications only one or two wavelengths of light are necessary to provide the information from source 509. Thus combiner 511 can be designed to only reflect these one or two wavelengths while passing all other wavelengths of light. The advantage of this technique is that the reflective coating can be made very efficient, thus reflecting most of the radiation of the predetermined wavelengths from source 509 while passing all but a very small portion of the spectrum radiated by source 527.

If source 509 is an LCD, then the light emitted by source 509 is linearly polarized. Given this light source, in the preferred embodiment of this configuration combiner 511 is a polarizing beam splitter which is highly efficient in reflecting the polarized light emitted by source 509. Given a 90/10 beam splitter, and further assuming that source 527 emits unpolarized light, approximately 50 percent of the light emitted by source 527 will be passed by combiner 511. In this configuration linear polarizer 515 is not required.

Figure 6:
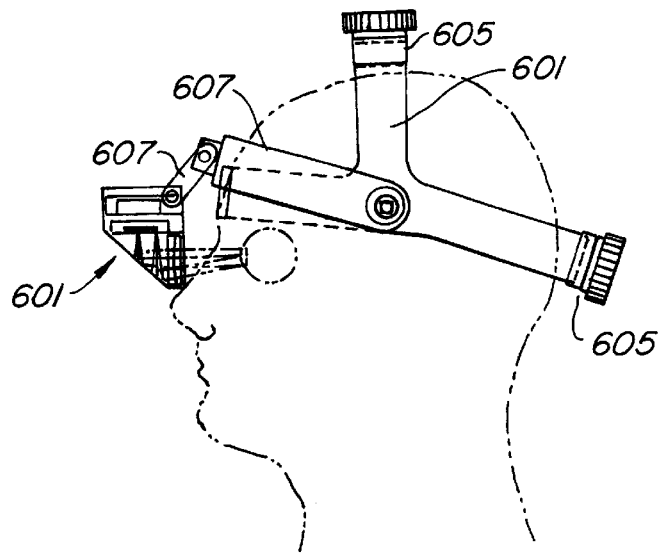
FIG. 6 illustrates the use of the invention in a headset configuration.

FIG. 6 illustrates the use of the invention in a headset configuration. The apparatus in this configuration includes a head mount 601 which attaches the apparatus to a user's head, and a display 603. In this embodiment display 603 is of the same design as shown in FIG. 5. Sizing knobs 605 adjust the size of the head mount to fit an individual user's head size. Display 603 is attached to head mount 601 via adjustable arms 607.

In general, those skilled in the art to which this invention relates will recognize that many changes in construction and widely differing embodiments will suggest themselves without departing from the spirit and essential characteristics thereof. For example, the curvature of singlets 105 and 107 may be varied in order to impart different optical powers to the system. Further, depending upon the desired application, the shape of the interface between singlets 105 and 107 may be spherical, aspheric, or plano. Further still, the reflective coating between the singlets need not be a 50/50 dielectric coating. Further still, a singlet can be used instead of the doublet as previously noted.

Accordingly, the disclosures and descriptions herein are intended to be illustrative, but not limiting, of the scope of the invention which is set forth in the following claims.

What is claimed is:

1. An optical collimating apparatus for focussing an image at infinity or at a desired finite distance as viewed by an observer, the apparatus comprising:

an optical element;

a partially reflective coating deposited on a surface of said optical element;

an image source for producing said image with light of at least a first rotary sense of circular polarization, said image source proximate to a first side of said optical element;

a quarter wave plate proximate to a second side of said optical element, said quarter wave plate altering said first rotary sense of circular polarization to a first linear sense of polarization; and a polarization selective optical element proximate to said quarter wave plate, said polarization selective optical element substantially reflecting light of said first linear sense of polarization without altering said first linear sense of polarization, and said polarization selective optical element substantially transmitting light of a second linear sense of polarization, wherein said second linear sense of polarization is orthogonal to said first linear sense of polarization.

2. The apparatus of claim 1, wherein said surface of said optical element is concave.

3. The apparatus of claim 1, wherein said surface of said optical element is equivalent to said first side of said optical element.

4. The apparatus of claim 1, wherein said surface of said optical element is equivalent to said second side of said optical element.

5. The apparatus of claim 1, said optical element comprising:
- a first optical singlet having a first surface and a second surface; and
- a second optical singlet having a first surface and a second surface, said first surface of said first optical singlet coupled to said first surface of said second optical singlet, wherein said partially reflective coating is interposed between said first surface of said first optical singlet and said first surface of said second optical singlet.

6. The apparatus of claim 5, wherein said first surface of said first optical singlet is concave, said second surface of said first optical singlet is plano, said first surface of said second optical singlet is convex, and said second surface of said second optical singlet is plano.

7. The apparatus of claim 1, wherein said image source is comprised of a liquid crystal display transmitting linearly polarized light and a circular polarizer for converting said linearly polarized light to at least said first rotary sense of circular polarization.

8. The apparatus of claim 1, wherein said image source is comprised of a liquid crystal display transmitting linearly polarized light and a quarter wave retarder element for converting said linearly polarized light to at least said first rotary sense of circular polarization.

9. The apparatus of claim 1, wherein said image source is comprised of a simple source, a linear polarizing element, and a circular polarizer for converting linearly polarized light to at least said first rotary sense of circular polarization.

10. The apparatus of claim 1, wherein said image source is comprised of a simple source, a linear polarizing element, and a quarter wave retarder element for converting linearly polarized light to at least said first rotary sense of circular polarization.

11. The apparatus of claim 1, further comprising a polarizing element bonded to an exit surface of said polarization selective optical element.

12. The apparatus of claim 11, further comprising an anti-reflection coating bonded to an exit surface of said polarizing element.

13. The apparatus of claim 1, further comprising a combiner element to combine said image with a second image produced by a second image source, said second image source in the line-of-sight of the observer, said combiner element interposed between said second image source and said first side of said optical element.

14. The apparatus of claim 5, further comprising a combiner element to combine said image with a second image produced by a second image source, said second image source in the line-of-sight of the observer, said combiner element interposed between said second image source and said second surface of said first optical singlet.

15. An optical apparatus for combining a first image and a second image, the apparatus comprising:
- a first optical singlet having a first surface and a second surface;
- a second optical singlet having a first surface and a second surface, said first surface of said first optical singlet coupled to said first surface of said second optical singlet;
- a partially reflective coating interposed between said first surface of said first optical singlet and said first surface of said second optical singlet;
- a LCD image source producing said first image with linearly polarized light of a first linear polarization within at least a first wavelength band;
- a polarizing beam splitter interposed between said LCD image source and said second surface of said first optical singlet, wherein a portion of said light of said first linear polarization and within said first wavelength band from said LCD image source is reflected by said polarizing beam splitter toward said first optical singlet;
- a second image source producing said second image, wherein a portion of said light from said second image source is transmitted by said polarizing beam splitter toward said first optical singlet;
- a circular polarizer proximate to said second surface of said first optical singlet, wherein said circular polarizer converts light of said first linear polarization to light of said first rotary sense of circular polarization;
- a quarter wave plate proximate to said second surface of said second optical singlet, said quarter wave plate altering said first rotary sense of circular polarization to a first linear sense of polarization; and
- a polarization selective optical element proximate to said quarter wave plate, said polarization selective optical element substantially reflecting light of said first linear sense of polarization without altering said first linear sense of polarization, and said polarization selective optical element substantially transmitting light of a second linear sense of polarization, wherein said second linear sense of polarization is orthogonal to said first linear sense of polarization.

16. An optical collimating apparatus for focussing an image at infinity or at a desired finite distance as viewed by an observer, the apparatus comprising:
- a first optical singlet having a first surface and a second surface; and
- a second optical singlet having a first surface and a second surface, said first surface of said first optical singlet coupled to said first surface of said second optical singlet;
- a partially reflective coating interposed between said first surface of said first optical singlet and said first surface of said second optical singlet;
- an image source for generating said image, said image source coupled to said second surface of said first optical singlet;
- a linear polarizer interposed between said image source and said first optical singlet;
- a circular polarizer interposed between said linear polarizer and said first optical singlet, wherein at least a portion of light generated by said image source and passing through said linear polarizer and said circular polarizer has a first rotary sense of circular polarization;
- a quarter wave plate coupled to said second surface of said second optical singlet, said quarter wave plate altering said first rotary sense of circular polarization to a first linear sense of polarization; and
- a polarization selective optical element proximate to said quarter wave plate, said polarization selective optical element substantially reflecting light of said first linear sense of polarization without altering said first linear sense of polarization, and said polarization selective optical element substantially transmitting light of a second linear sense of polarization, wherein said second linear sense of polarization is orthogonal to said first linear sense of polarization.

17. A method for optically collimating an image at infinity or at a desired finite distance from an observer, comprising the steps of:

directing an image light having components within at least a first rotary sense of circular polarization at a first side of an optical element, said optical element including a partially reflective coating;

converting said image light passing through said optical element from said first rotary sense of circular polarization to a first linear sense of polarization with a first quarter wave plate;

reflecting said passed image light of said first linear sense of polarization with a polarization selective optical element, said reflected image light directed at a second side of said optical element;

collimating a portion of said reflected image light with said partially reflective coating, said first rotary sense of circular polarization changing to a second rotary sense of circular polarization upon reflection by said partially reflective coating;

converting said collimated image light of said second rotary sense of circular polarization to a second linear sense of polarization with said first quarter wave plate; and projecting said collimated image light of said second linear sense of polarization through said polarization selective optical element to said observer.

18. The method of claim 17, further comprising the steps of:

generating said image light with an image source; and passing said image light through a linear polarizing element and a second quarter wave plate for creating image light having components within at least said first rotary sense of circular polarization.

* * * * *